United States Patent Office 3,497,298
Patented Feb. 24, 1970

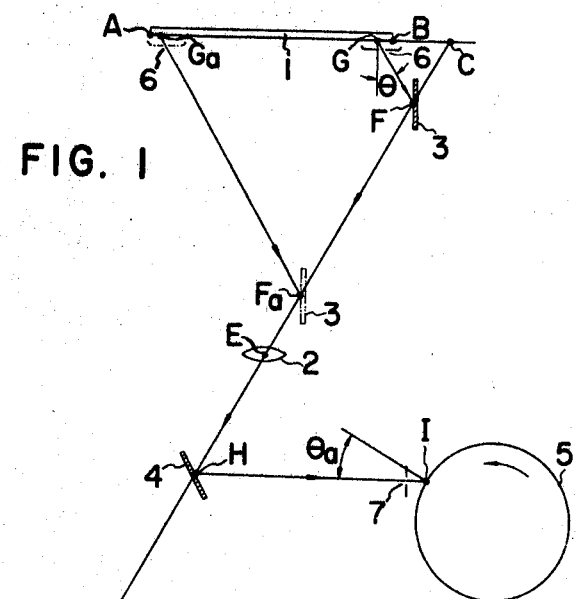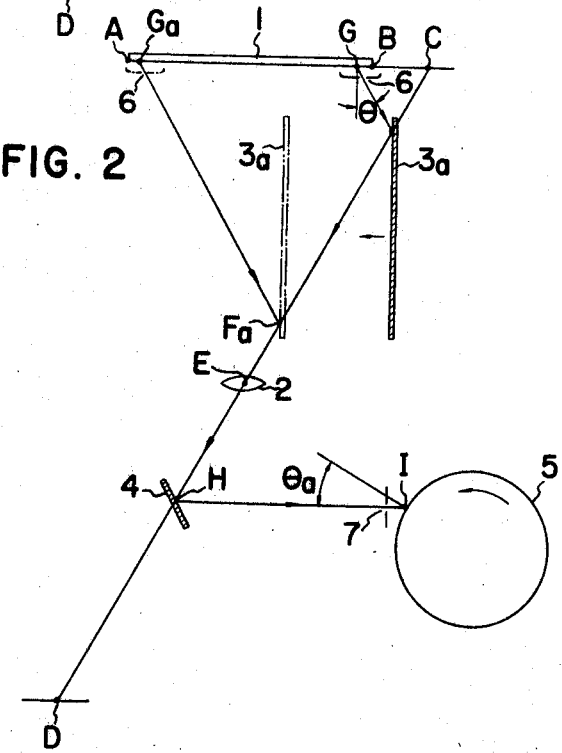

3,497,298
OPTICAL SCANNING METHOD FOR COPYING MACHINES
Masanori Watanabe, Tokyo-to, Japan, assignor to Katsuragawa Denki Kabushiki Kaisha, Tokyo-to, Japan, a joint-stock company of Japan
Filed Sept. 13, 1966, Ser. No. 579,138
Claims priority, application Japan, Sept. 18, 1965, 40/57,257
Int. Cl. G03b 27/58, 27/62, 27/70
U.S. Cl. 355—47                       6 Claims

ABSTRACT OF THE DISCLOSURE

In an optical scanning method wherein a surface of a stationary object is scanned by a continuously moving reflective mirror and is recorded on a recording medium moving synchronously with the reflective mirror through an optical lens. The lens is arranged at a fixed distance from the surface of the object with its optical axis maintained perpendicular to the surface. The reflective mirror is disposed at right angles with respect to the surface and is moved so that the point of reflection thereof always operates on a straight line which interconnects one point on an extension of the surface of the object and the center of the lens, whereby the image of the object is transmitted while the length of the optical path between any point on the surface and the lens is maintained constant.

---

This invention relates to an improved optical scanning method for a copying machine of the type wherein a surface of an object is scanned by an optical image transmission system including an optical lens and a reflective lens, and the transmitted image is recorded on a recording medium to obtain a replica of said object.

It is an object of this invention to produce a clear replica of an object by utilizing a copying machine of simple construction.

According to this invention, there are provided a stationary lens having an optical axis perpendicular to the surface of the object and a reflective mirror at right angles to said surface. In order to scan the surface of the object said reflective mirror is moved so that the reflective surface thereof always operates on a straight line which interconnects one point on an extension of said surface and said lens, whereby the image of said object is transmitted while the length of the optical path between any point on said surface and said lens is maintained constant. Thus, all points on said surface are focussed on the same focus, thus providing a clear replica of the object by means of a very simple optical means.

For a more complete understanding of this invention reference may be had to the following detailed explanations in connection with the accompanying drawings in which FIGS. 1 and 2 are schematic views of two embodiments of this invention which are helpful for explaining the principle of the invention.

Referring now to FIG. 1 of the accompanying drawing, a fixed lens 2 is disposed at a fixed distance from the lower surface of an object 1 and with its optical axis maintained perpendicular to said lower surface. A point C is selected on an extension of a line interconnecting two spaced points A and B on the lower surface, or the surface to be recorded of the object 1. Then the image of this point C is focussed at a point D by the lens 2. A point F is selected on a line CE which interconnects the point C and the center E of the lens 2. As shown in the drawing, the point F is selected close to the point C, and a point G is selected on the line AC at a point spaced from the point C by a distance equal to the length of FC. Then an equilateral triangle FCG having an apex angle CFG is defined. If a first reflective mirror 3 is disposed along a line which passes through the apex F and intersects the base GC at right angles, the surface of the object 1 at the point G will be reflected by the first reflective mirror 3 at the point F so that the point G may be focussed by the lens 2 at the point D as if the point G were situated at the point C. The same relation holds true for any point, for example $F_a$, other than the point F on the line EC. Thus, if it is assumed now that a point $G_a$ indicates a point of intersection between the line AC and a line which passes through the point $F_a$ in parallel with the line FG, the triangles $F_aCG_a$ and FCG would be similar, and hence equilateral. Thus, it is clear that the point $G_a$ on the surface of the object 1 can also be focussed at the point D as if it were situated at the point C.

This invention utilizes this principle. In the embodiment shown in FIG. 1, a relatively small vertical reflective mirror 3 is utilized which is obliquely moved along the line FE toward the point $F_a$, whereas in the modification shown in FIG. 2, a relatively large vertical reflective mirror $3_a$ is moved in the horizontal direction toward the point $F_a$. In any case, the lower surface of the object 1 is continuously scanned by the movement of the reflective mirror, and the successive points on said surface are successively focussed at the same point D through the lens 2 and through optical paths tof the same length as if these points were located at the point C.

While there are many methods for transmitting the image from the lens 2 to a recording medium, in the embodiments illustrated, there is provided a second reflective mirror 4 at any desired angle and at an intermediate point H between the lens 2 and its focus D, and a rotary drum 5 carrying a recording medium is positioned so that the light beam reflected by the second reflective mirror 4 will impinge on the recording medium at a point I which is spaced from the point H by a distance equal to the length HD. The rotary drum 5 is rotated in the direction indicated by an arrow at a speed corresponding to the scanning speed of the object 1 by the first reflective mirror 3 to record the image of the object 1 on the recording medium provided on the periphery of the drum 5. It is preferable to arrange the recording drum so that the incident angle $\theta_a$ of the reflected beam becomes equal to the angle of reflection $\theta$ on the object 1. It is also preferable to provide a scanning slit 6 which is moved along the lower surface of the object 1 in synchronism with the scanning speed and a fixed slit 7 adjacent to the recording drum. It is to be noticed that the light beam which represents the image of the object and passes through the lens 2 passes through only a limited range including the inclined line FH, so that it is necessary to limit the angle of inclination of the light beam which follows an inclined path in the range of effective picture angle of the lens 2.

Thus, in accordance with this invention, by a very simple operation of moving a single reflective mirror in a predetermined direction, the surface of the object can be readily scanned so that it is possible to readily provide a clear replica of an object with an optical apparatus of very simple construction.

While the invention has been shown and described in connection with some preferred embodiments thereof, it should be understood that many modifications may be made without departing from the true spirit and scope of the invention as defined in the appended claims.

What is claimed is:
1. In a copying machine wherein a substantially plane surface portion of an object is scanned by an optical image transmission system including an optical lens and a reflective mirror, and the transmitted image is recorded on a recording medium, a scanning method comprising the steps of providing a fixed lens with its optical axis maintained substantially perpendicular to said surface portion, disposing said reflective mirror in all positions substantially at right angles with respect to said surface portion and moving said reflective mirror so that the portion of the reflective surface thereof that projects the reflected image towards said lens always operates on a straight line which interconnects one point on an extension of said surface and said lens, whereby the image of said object is transmitted while the length of the optical path between any point on said surface and said lens is maintained constant.

2. The scanning method according to claim 1 wherein a relatively small reflective mirror is used which is moved along an oblique line interconnecting said one point and said lens.

3. The scanning method according to claim 1 wherein a relatively large reflective mirror is used, said straight line being oblique relative to said surface portion.

4. The scanning method according to claim 1 wherein the image of said object which passes through said lens is reflected to a recording medium by means of a second reflective mirror.

5. The scanning method according to claim 1 wherein said recording medium is carried by a rotary drum which is rotated in synchronism with the movement of said reflective mirror.

6. In a copying machine wherein a surface of a stationary object is scanned by a continuously moving reflective mirror means and is recorded on a recording medium moving synchronously with said reflective mirror means through an optical lens, a scanning method comprising the steps of arranging said lens at a fixed distance from the surface of said object with its optical axis maintained perpendicular to said surface, disposing said reflective mirror at right angles with respect to said surface and moving said reflective mirror so that the point of reflection thereof always operates on a straight line which interconnects one point on an extension of said surface of said object and the center of said lens, whereby the image of said object is transmitted while the length of the optical path between any point on said surface and said lens is maintained constant.

References Cited
UNITED STATES PATENTS 2,818,465  12/1957  Brink _____ 88—24
3,142,224  7/1964  Andrews et al. _____ 88—24

FOREIGN PATENTS 442,963  1/1968  Switzerland.

NORTON ANSHER, Primary Examiner
WAYNE A. SIVERTSON, Assistant Examiner

U.S. Cl. X.R.
355—66